US012651140B2

(12) United States Patent
Hou et al.

(10) Patent No.: US 12,651,140 B2
(45) Date of Patent: Jun. 9, 2026

(54) PRINTABLE WRISTBANDS WITH INTEGRATED CIRCUIT COMPONENTS

(71) Applicant: ZEBRA TECHNOLOGIES CORPORATION, Lincolnshire, IL (US)

(72) Inventors: Chien K. Hou, Morris Plains, NJ (US); Annika Matas Alonzo, Northridge, CA (US); David F. Beck, Exeter, RI (US); Mohannad Abdo, Clifton, NJ (US); Eric W. Liberato, Pequannock, NJ (US); Gene A. Hofer, Lake Zurich, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/896,272

(22) Filed: Sep. 25, 2024

(65) Prior Publication Data

US 2026/0087301 A1     Mar. 26, 2026

(51) Int. Cl.
*G06K 19/077* (2006.01)

(52) U.S. Cl.
CPC .............................. *G06K 19/07762* (2013.01)

(58) Field of Classification Search
None
See application file for complete search history.

(56) References Cited

U.S. PATENT DOCUMENTS 7,240,446 B2 *    7/2007    Bekker .................. G09F 3/005
                                                              40/633

* cited by examiner

*Primary Examiner* — Kristy A Haupt

(57)                    ABSTRACT

A wristband includes: a self-laminating body having: (i) a first film; (ii) an image-carrying member disposed on an outer surface of the first film; and (iii) a second film disposed over an outer surface of the image-carrying member, enclosing the image-carrying member between the first film and the second film; a band extending from one of the first film and the second film of the self-laminating body, the band configured to encircle a wrist; and a flexible integrated circuit chip enclosed between the first film and the second film of the self-laminating body.

21 Claims, 8 Drawing Sheets

PRINTABLE WRISTBANDS WITH INTEGRATED CIRCUIT COMPONENTS

BACKGROUND

Wristbands can be used to associate information with a wearer (e.g., a human) in a wide variety of contexts. For example, wristbands may be used for patient identification in healthcare facilities such as hospitals. Some wristbands, such as those configured to receive the above-mentioned information via a printer such as a laser printer, inkjet-printer, or the like, are limited to carrying such information as printed indicia on a surface of the wristband.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figures 1A, 1B, 1C:
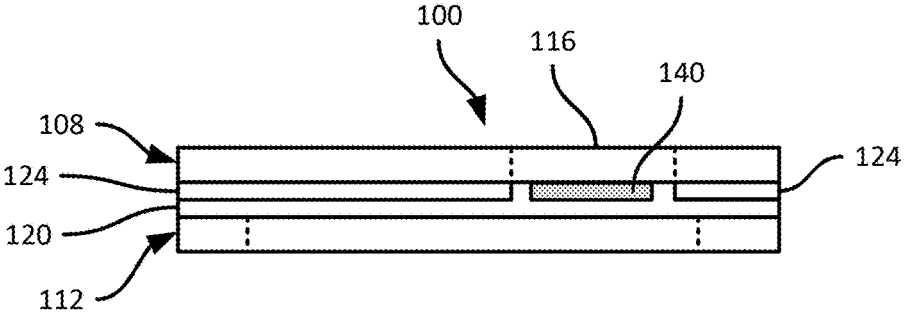
FIG. 1A is a diagram of a blank defining a wristband, viewed from a first side.
FIG. 1B is a diagram of the blank of FIG. 1A, viewed from a second side.
FIG. 1C is a cross-section of the blank of FIG. 1A.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a wristband, comprising: a self-laminating body having: (i) a first film; (ii) an image-carrying member disposed on an outer surface of the first film; and (iii) a second film disposed over an outer surface of the image-carrying member, enclosing the image-carrying member between the first film and the second film; a band extending from one of the first film and the second film of the self-laminating body, the band configured to encircle a wrist; and a flexible integrated circuit chip enclosed between the first film and the second film of the self-laminating body.

Additional examples disclosed herein are directed to a wristband, comprising: a self-laminating body having: (i) a first film; (ii) an image-carrying member disposed on an outer surface of the first film; and (iii) a second film disposed over an outer surface of the image-carrying member, enclosing the image-carrying member between the first film and the second film; a first band extending from the self-laminating body; a second band configured to couple with a distal end of the first band, the second band having a coupling portion configured to engage with the distal end of the first band; and a flexible integrated circuit chip disposed on one of the distal end of the first band, and the coupling portion of the second band.

Further examples disclosed herein are directed to a printable blank, comprising: a face stock layer including die cuts defining a removable image-carrying member having a first surface configured to receive printed indicia; a film layer coupled to a second surface of the face stock layer, opposite the first surface, the film having die cuts defining a wristband including: a self-laminating body aligned with the image-carrying member, the body having a first film, and a second film configured to laminate the image-carrying member to the first film; and a flexible integrated circuit chip disposed between the face stock layer and the film layer.

FIGS. 1A, 1B, and 1C illustrate a sheet of media, also referred to as a blank 100, having a wristband 104 die cut therein. The blank 100 and the wristband 104 are referred to as printable, in that the blank 100 can be fed into any of a variety of printers, including laser printers, inkjet printers, or the like. The wristband 104 can, in other words, have indicia applied thereto by a variety of printing devices that need not be specifically designed to handle the blank 100. As will be understood by those skilled in the art, the blank 100 can include more than one die cut wristband 104 in other examples, e.g., depending on the size of the blank 100 and of the wristband 104. In further examples, the blank 100 can also include one or more die cut labels or other articles. The nature of the indicia applied to the wristband 104 (and/or the labels, when the blank 100 also includes labels) can vary widely. For example, the information printed on the wristband 104 can include patient identification information (e.g., a patient name, a unique patient identifier, and the like).

Some wristbands or other articles configured to carry information such as the above-mentioned patient identification information may include integrated circuit components such as radiofrequency (RF) tags (e.g., radiofrequency identification (RFID) tags or near-field communication (NFC) tags). An RF tag can store, for example, the same identification information as is printed on the wristband, and/or additional associated information. RF tags may have sufficient thickness and/or stiffness to be incompatible with at least some of the printers mentioned above. Articles such as wristbands that incorporate RF tags therefore may be fabricated to be sufficiently thick to embed an RF tags and/or structurally protect the RF tags against potentially damaging flexing during use of the wristband. However, the thickness of such articles (e.g., wristbands) may prevent the articles from being printable such that applying arbitrary indicia to a wristband at the point of use, e.g., as in a healthcare setting, is a challenge.

As discussed below, the wristband 104 shown in FIGS. 1A-1C includes an RF tag 140 having an antenna and a flexible integrated circuit (IC) chip disposed on a flexible substrate, enabling the storage of information on such a circuit while being sufficiently thin to retain the printability of the wristband 104. For example, laser printers may be compatible with paper having a weight of up to about 400 grams per square meter (GSM), which may have a thickness of about 0.43 mm. Laser printers, e.g., consumer-grade and/or small and medium sized business (SMB) printers, may therefore have a printable range of media thicknesses between about 0.06 mm (e.g., the thickness of 80 GSM paper) and about 0.43 mm. The construction of the wristband 104 described herein may provide a total blank thickness that is within the above range. For example, the blanks described herein may have a thickness of up to the upper limit of the above printable range. In some examples, the blanks may have a thickness that is between the lower limit of the above range (e.g., about 0.06 mm) and about 75% of the upper limit (e.g., about 0.32 mm). In further examples, the blanks may have a thickness that is between about 0.26 mm (e.g., about 60% of the above-mentioned upper limit) and about 0.29 mm (e.g., about 67% of the above-mentioned upper limit).

FIG. 1A illustrates the blank from a first side, while FIG. 1B illustrates the blank 100 from a second side opposite the first side, and FIG. 1C illustrates a cross-section of the blank 100 taken at the section line 1C-1C as labelled in FIG. 1A. The blank 100 includes a plurality of layers of material, including a face stock layer 108, and a film layer 112. The face stock layer 108 can include a plurality of subcomponents, such as a substrate of paper, polyester or another suitable polymer, and a pigment-receiving coating an outer surface of the substrate (e.g., the surface facing away from the film layer 112). The face stock layer 108 can further include adhesives or the like to bind the substrate with the above coating in some examples.

The face stock layer 108 defines certain components of the wristband 104, including in this example an image-carrying member 116, which can also be referred to as an image-receiving portion, or a printable portion, of the wristband 104. The image-carrying member 116 is die cut (as indicated by the surrounding solid line in FIG. 1A, and the dashed lines in FIG. 1C) to allow separation of the image-carrying member 116 from the remainder of the face stock 108. The image-carrying member 116 is configured to receive indicia, e.g., in a printer, and to remain affixed to the wristband 104 when the wristband 104 is removed from the blank 100 after printing.

As seen in FIG. 1C, in this example the blank 100 includes an adhesive layer 120 (e.g., pressure-sensitive adhesive or PSA, hot-melt adhesive, or the like) binding at least certain portions of the film layer 112 with at least certain portions of the face stock layer 108. The blank 100 can also include a release layer 124 in some regions, to enable part of the film layer 112 to be peeled off the face stock layer 108. In the example shown in FIG. 1C, the adhesive 120 binds the film layer 112 directly to the face stock layer 108 in the region of the image-carrying member 116. As will be apparent to those skilled in the art, a wide variety of arrangements of adhesives and/or release films, coatings, or the like, can be employed to facilitate adhesion and/or separability of various portions of the blank 100 from one another.

The face stock layer 108 can also define a tab 128, e.g., via additional die cuts. The tab 128 can be removed from the blank 100 with the remainder of the wristband 104, and can be removed during assembly of the wristband 104, e.g., to expose a pressure-sensitive adhesive used to couple one end of the wristband 104 with another end and thereby form a loop with the wristband 104. In some examples, as shown in FIGS. 1A and 1B, the blank 100 can also define another tab 132, associated with a band extension 136 that can optionally be employed to increase the circumference of the assembled wristband 104.

From the opposite side of the blank 100 shown in FIG. 1B, the film layer 112 is visible. The film layer 112 includes die cuts defining the wristband 104 and, optionally, the band extension 136. The wristband 104 and band extension 136 are therefore shown in solid lines in FIG. 1B, while the tabs 128 and 132, as well as the image-carrying member 116, are shown in dashed lines (being hidden behind the film layer 112). The die cuts defining the wristband 104 are also shown in FIG. 1C as dashed lines. The film layer 112 can include a vinyl film, or other suitable film material.

In addition to the above components, the blank 100 includes a flexible integrated circuit (IC) chip that forms a portion of a RF tag 140 (e.g., an RFID tag or an NFC tag). The tag 140 can include flexible substrate where the flexible IC chip is configured to bend and flex with the substrate. The RF tag 140 including the flexible IC chip can have a thickness that is small enough to permit the blank 100 and the RF tag 140 to be processed via a printer. For example, as noted above, the tag 140 can have a thickness small enough to permit the total thickness of the blank to remain below about 0.43 mm.

In some examples, the RF tag 140 including the flexible IC chip may have a thickness of between about 0.1 mm and about 0.15 mm. In some implementations the thickness of the RF tag 140 may be between about 0.12 mm and about 0.13 mm. More generally, the RF tag 140 can have a thickness that represents between about 25% and about 75% of the total thickness of the blank 100 (including the RF tag 140). As will be understood by those skilled in the art, the thickness of the blank 100 may vary at different portions of the blank 100. The portion containing the RF tag 140 can have the highest thickness, such that any other portion of the blank is thinner than the portion containing the RF tag 140. The tag 140 is disposed between the film layer 112 and the face stock layer 108. In this example, the tag 140 is between the image-carrying member 116 and the film layer 112. As discussed below, the tag 140 can also be implemented in various other locations of the wristband 104.

Figure 2:
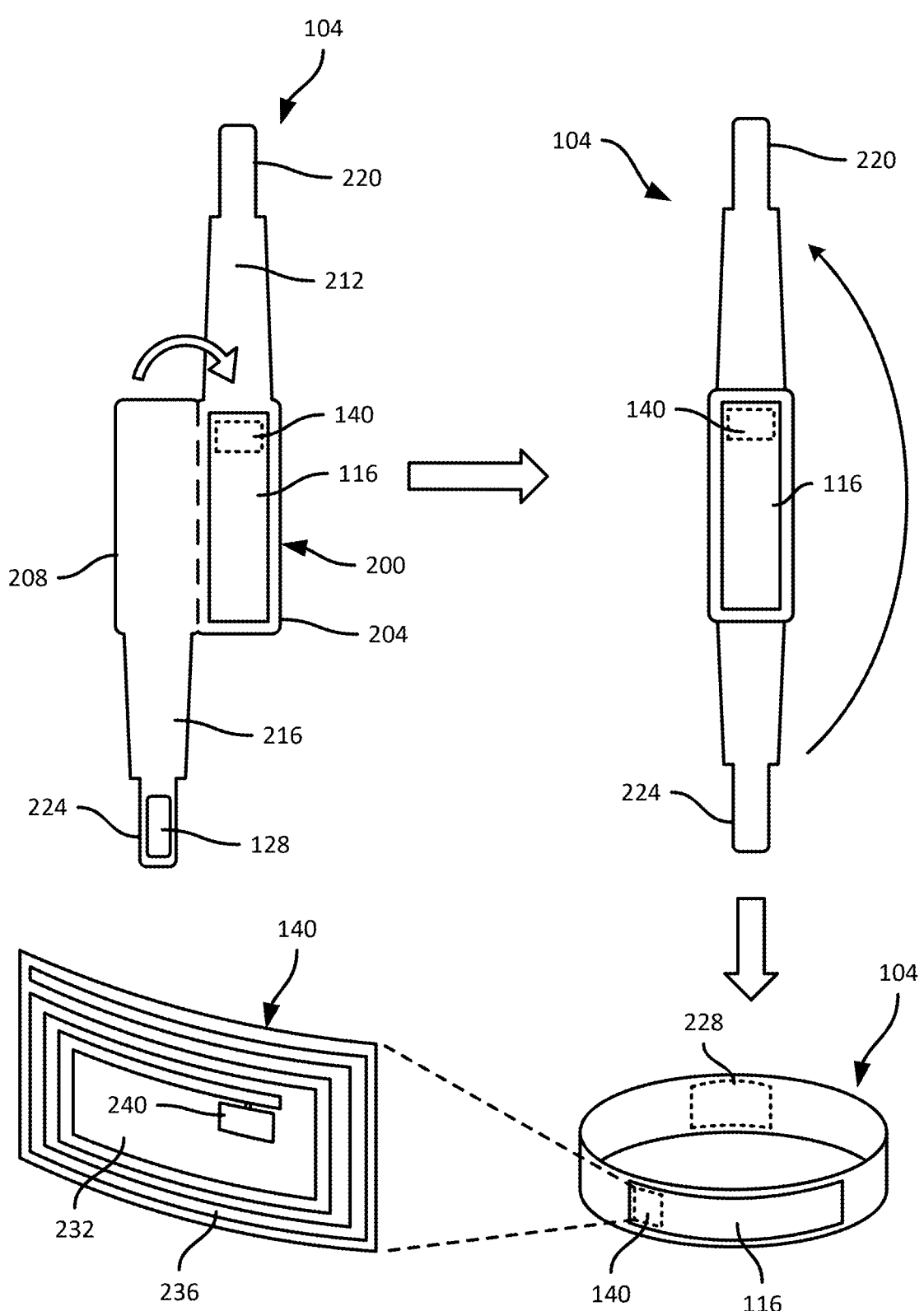
FIG. 2 is a diagram illustrating the assembly of the wristband from FIGS. 1A-1C.

To remove and assemble the wristband 104, the tab 128 can be pushed from the outer surface of the face stock layer 108, e.g., through the blank 100. The tab 128 and the underlying portion of the film layer 112 can be pulled to peel the wristband 104 from the face stock layer 108. Turning to FIG. 2, the wristband 104 is shown separated from the blank 100, and retaining certain portions of the face stock layer 108 according to the die cuts defined therein. The wristband 104 includes a self-laminating body 200, including a first film 204 and a second film 208. The portions of the wristband 104, in this example, are integrally formed (e.g., of a single piece of the film layer 112). The first film 204 and second film 208 are therefore named separately not because they are physically separate pieces, but to clearly illustrate the function of each portion of the wristband 104.

The image-carrying member 116 is disposed on the first film 204, and the RF tag 140 is enclosed between the first film 204 and the image-carrying member 116. The RF tag 140, in other words, need not be visible, and the entire area of the image-carrying member 116 can bear indicia without obstruction by the RF tag 140.

The wristband 104 also includes at least one band element extending from the body 200. In this example, the wristband 104 includes a first band 212 extending from the first film 204, and a second band 216 extending from the second film 208. The second band 216, in this example, carries the tab 128 and, e.g., underneath the tab 128, a patch of PSA. To assemble the wristband 104, the second film 208 can be folded relative to the first film 204, about the dashed line shown in FIG. 2, such that the second film 208 encloses the image-carrying member 116. The wristband 104, in other words, is self-laminating, in that the image-carrying member 116 is laminated by the first and second films 204 and 208 of the body 200. The films 204 and/or 208 can include a pressure-sensitive adhesive to affix a perimeter of the first film 204 to the second film 208.

When the body 200 has been folded to laminate the image-carrying member 116, the bands 212 and 216 can be curved to bring a distal end 220 of the band 212 into contact with a distal end 224 of the band 216 (which carries the tab 128). The tab 128 can be removed to expose the above-mentioned adhesive, and the ends 220 and 224 can be pressed together to form the wristband into a loop, as shown in the lower portion of FIG. 2. The simplified depiction of the assembled wristband 104 in the lower portion of FIG. 2 illustrates a position of the image-carrying member 116, the concealed tag 140, and a region 228 where the ends 220 and 224 are joined. As the wristband 104 can bend with different curvatures to form the loop, the tag 140 including the flexible IC chip can also bend with the wristband 104 to conform to the different curvatures without the flexible IC chip separating from the substrate of the tag 140 and without damaging the flexible IC chip. As shown in the assembled illustration of the wristband 104 in FIG. 2, the tag 140 includes a flexible substrate 232, e.g., carrying an antenna 236 and a flexible IC chip 240, each of which can bend or otherwise deform with the wristband 104. The thickness of the portion of the wristband 104 containing the RF tag 140, when assembled, may be greater than the thickness of the blank, e.g., because the film 112 has been folded over that portion. For example, the thickness of the assembled wristband in the region containing the RF tag 140 may be increased by between about 0.05 mm and about 0.15 mm relative to the thickness of the blank 100, and the RF tag 140 may therefore represent a correspondingly smaller fraction of the wristband thickness (e.g., between about 15% and about 65% of the wristband thickness).

Figures 3A, 3B, 3C:
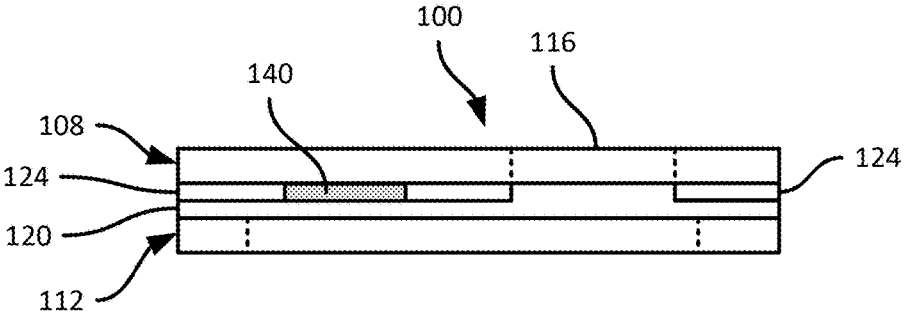
FIG. 3A is a diagram of another blank defining a wristband, viewed from a first side.
FIG. 3B is a diagram of the blank of FIG. 3A, viewed from a second side.
FIG. 3C is a cross-section of the blank of FIG. 3A.
Figure 4:
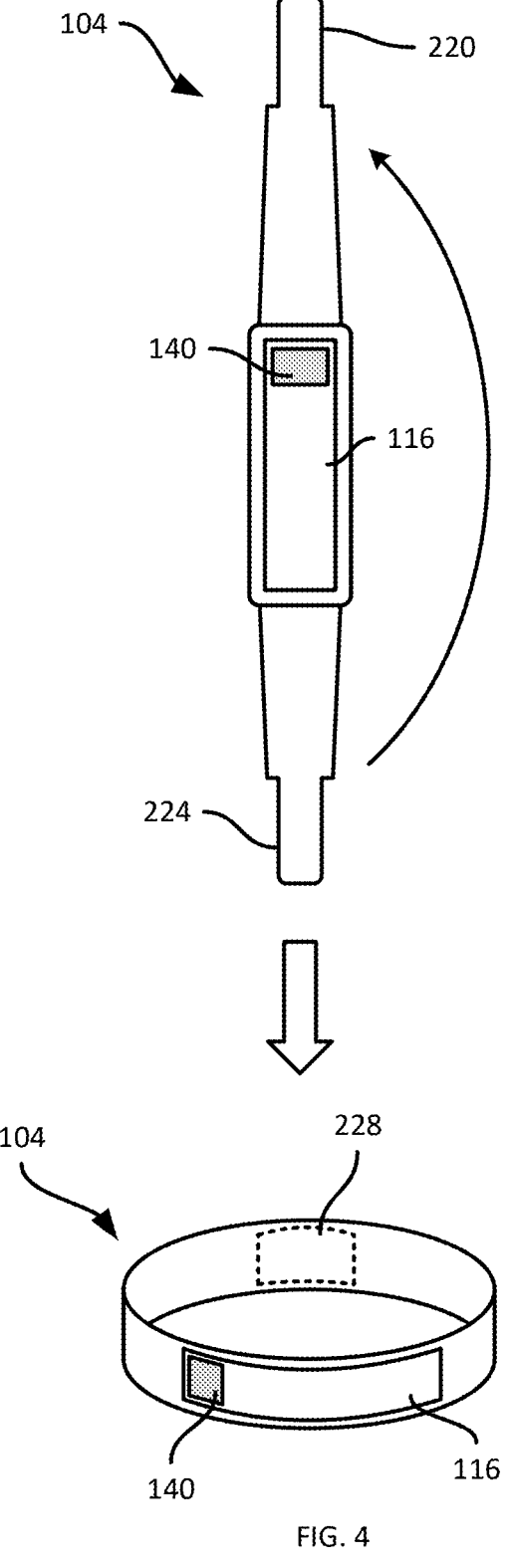
FIG. 4 is a diagram illustrating the assembly of the wristband from FIGS. 3A-3C.

FIGS. 3A, 3B, and 3C illustrate another embodiment of the wristband 104, in which the tag 140 is disposed between the film layer 112 and the face stock layer 108. Specifically, the tag 140 is between the film 208 and the face stock 108 in this example, rather than between the film 204 and the face stock 108. As shown in FIG. 4, the placement of the tag 140 in FIGS. 3A-3C results in the tag 140 being visible over the image-carrying member 116 when the wristband 104 is assembled. The image-carrying member 116 may therefore include a non-printed area aligned with the tag 140, coinciding with the region of the member 116 obscured by the tag 140 when the wristband 104 is assembled.

Figure 5:
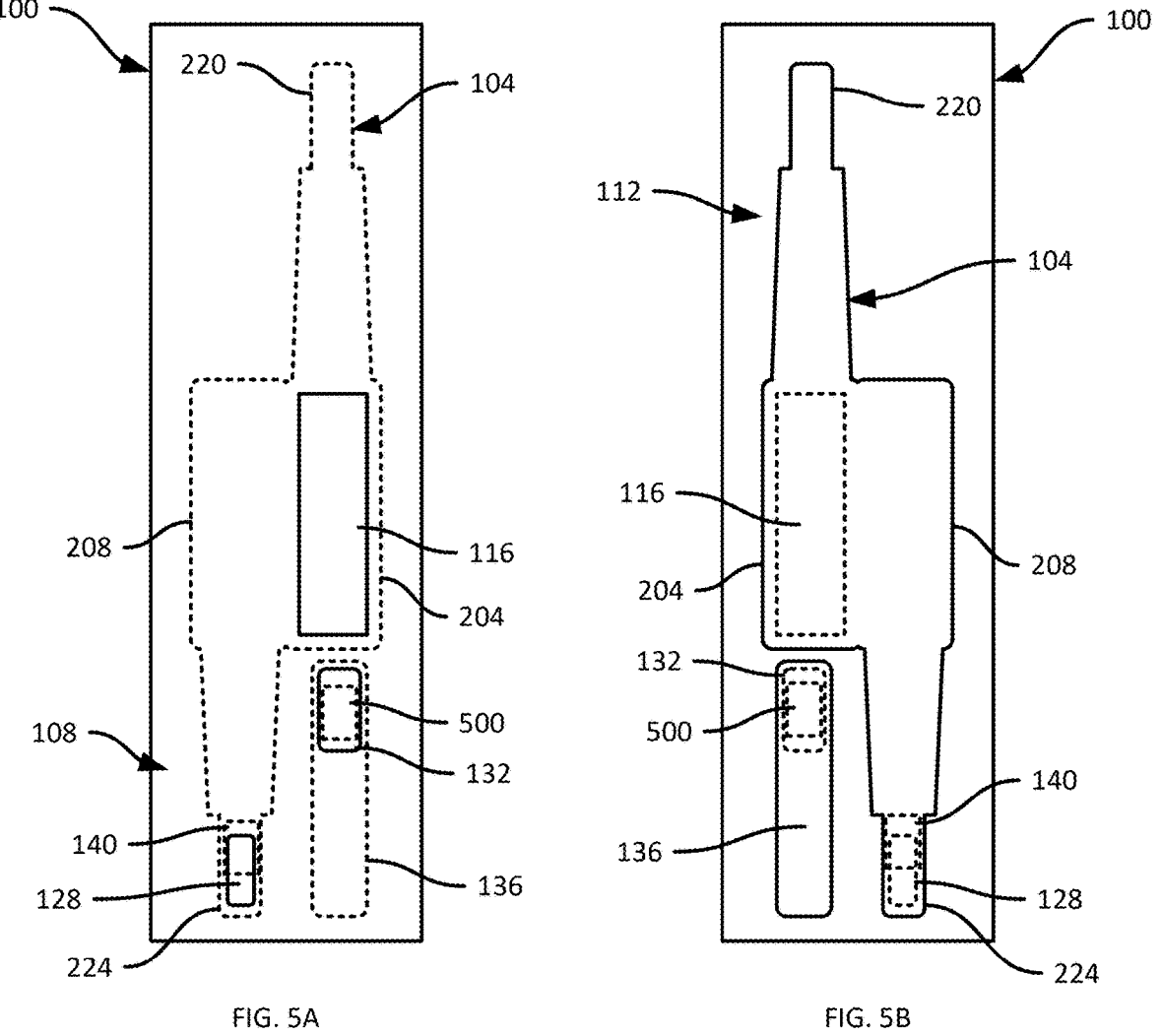
FIG. 5A is a diagram of another blank defining a wristband, viewed from a first side.
FIG. 5B is a diagram of the blank of FIG. 5A, viewed from a second side.

FIGS. 5A and 5B illustrate a further embodiment of the wristband 104, in which the tag 140 is disposed between the film layer 112 and the face stock layer 108 affixed to the end 224, e.g., between the tab 128 and the film layer 112. In this example, the tag 140 can therefore be exposed when the tab 128 is removed to affix the end 224 to the end 220, but the tag 140 is then laminated between the ends 220 and 224. As will be apparent, in other examples, the tag 140 can be placed between the film 112 and face stock 108, affixed to the end 220, rather than to the end 224.

In further examples, the tag 140, or a further RF tag 500, can be disposed between the film 112 and face stock 108, affixed to the band extension 136. For example, as shown in FIGS. 5A and 5B, the tag 500 can be disposed between the tab 132 and the film layer 112. The band extension 136, when used, can be removed from the blank 100, the tab 132 removed, and the end that carried the tab 132 affixed to the end 220 of the wristband 104. The other end of the band extension 136 can be affixed to the end 224 of the wristband 104. Thus, when the wristband 104 is assembled in this embodiment, the tag 500 is enclosed between the band extension 136 and either the end 220 or the end 224. In other examples, the band extension 136 can be looped around the wristband 104 and fastened to itself (e.g., the end carrying the tab 132 can be fastened to the opposite end of the band extension 136), such that an RFID-enabled ring is coupled around the wristband 104.

Figure 6:
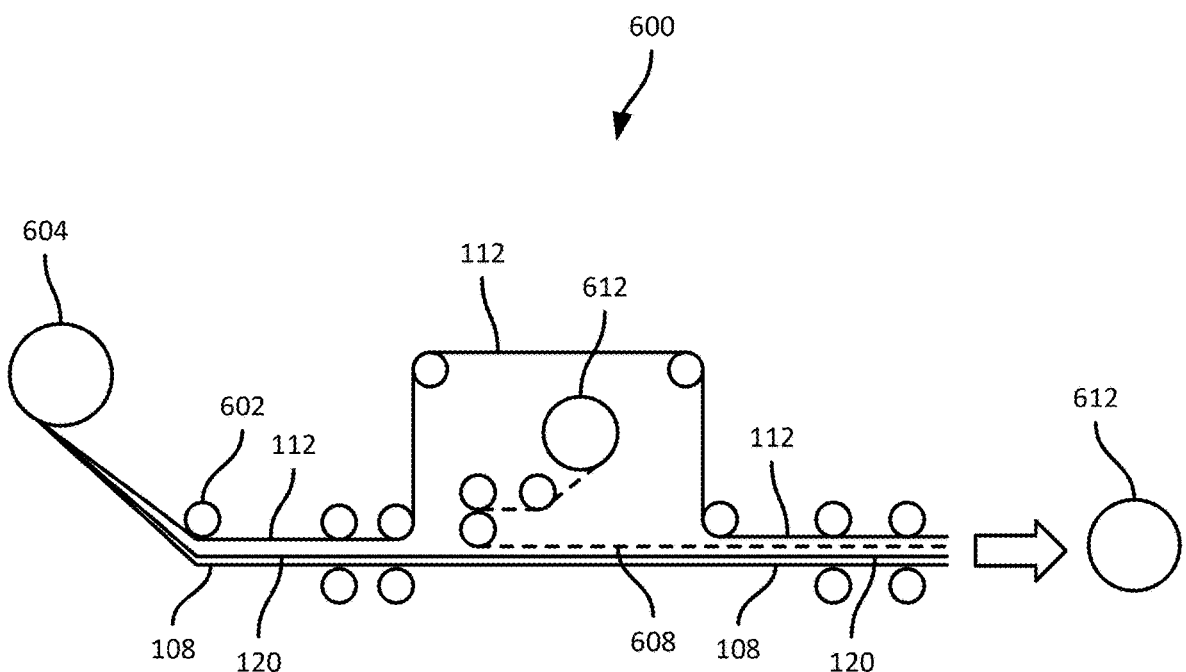
FIG. 6 illustrates an example press configuration for manufacturing blanks.

As will be apparent to those skilled in the art, the blank 100 can be manufactured according to various methods. In some examples, as illustrated in FIG. 6, a press 600 having a plurality of rollers 602 and/or other media-handling structures can be configured to accept the face stock 108 and film 112 from a supply 604 (e.g., a roll or the like) of pressure-sensitive stock material. The stock material can include, for example, the film 112, face stock 108, and adhesive 120 (the face stock 108 and adhesive 120 are shown separated for illustrative purposes, but need not be physically separated). The press 600 can be configured to separate the film 112 from the remainder of the supply media, and a web 608 carrying RF tags 140 can be introduced between the film 112 and face stock 108 (in this example, between the adhesive 120 and the film 112), e.g., from an RF tag supply 612. The layers of the PSA stock and the tag-carrying web can then be rolled together by the press 600 to produce blanks. The blanks 600 can be assembled into a rolled supply 612, in some examples, or output as sheets in other examples. The blanks can have cross sections as shown in FIG. 1C and/or FIG. 3C.

Figure 7:
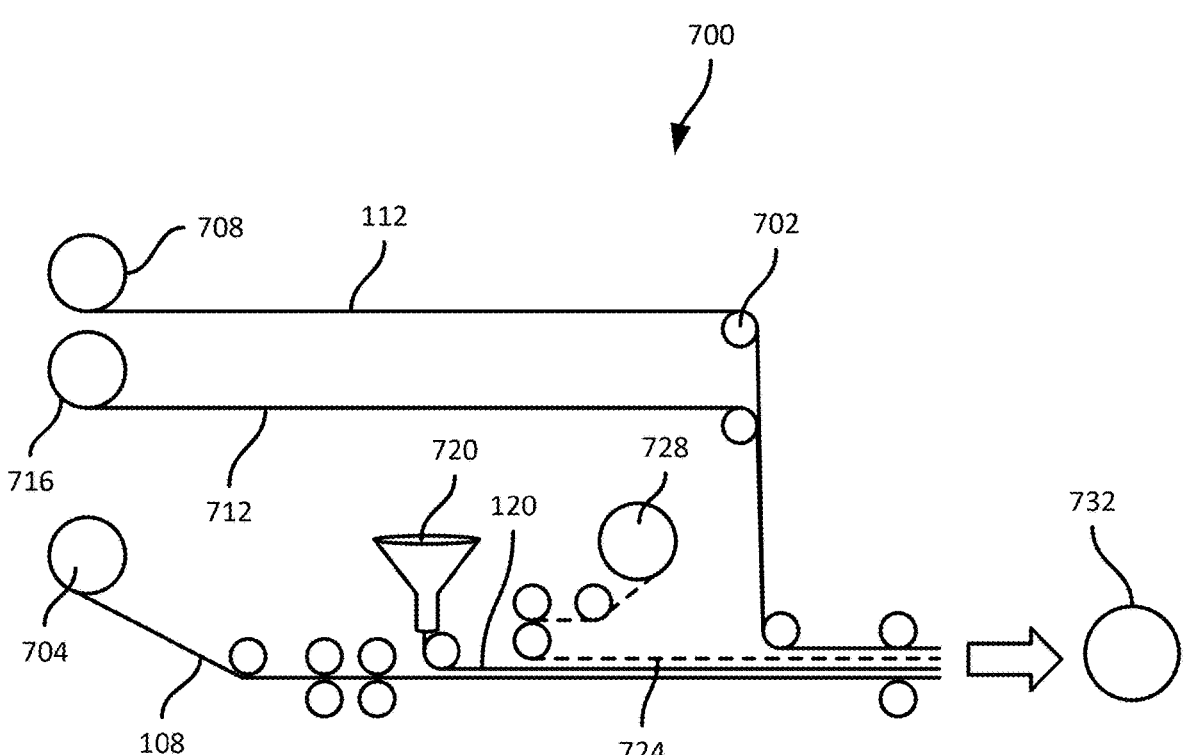
FIG. 7 illustrates another example press configuration for manufacturing blanks.

In other examples, as illustrated in FIG. 7, a press 700 having a plurality of rollers 702 and/or other media-handling structures can be configured to accept the face stock 108 from a supply 704, and the film 112 from a supply 708. The press 700 can also be configured, in some examples, to accept a liner 712, such as a paper liner, from a further supply 716. In examples where the blanks produced in the press 700 include both wristbands 104 and labels (e.g., additional die-cut portions of the face stock 108), the liner 712 can form a backing for the labels, and can be placed in substantially the same plane as the film 112 in the assembled blanks. The press can further be configured to apply the adhesive 120, e.g., in the form of a hot-melt adhesive from a dispenser 720, to the face stock 108. The press 700 can be further configured to introduce a web 724 (e.g., a dry inlay web, lacking adhesive) carrying RF tags 140 from a supply 728 between the face stock 108 and the film 112 and liner 712. The film 112, liner 712, web 724, and face stock 108 can be brought together and adhered at least in part by the adhesive 120, to produce blanks, which can be assembled into a rolled supply 732, or other suitable form of blank supply.

Figure 8:
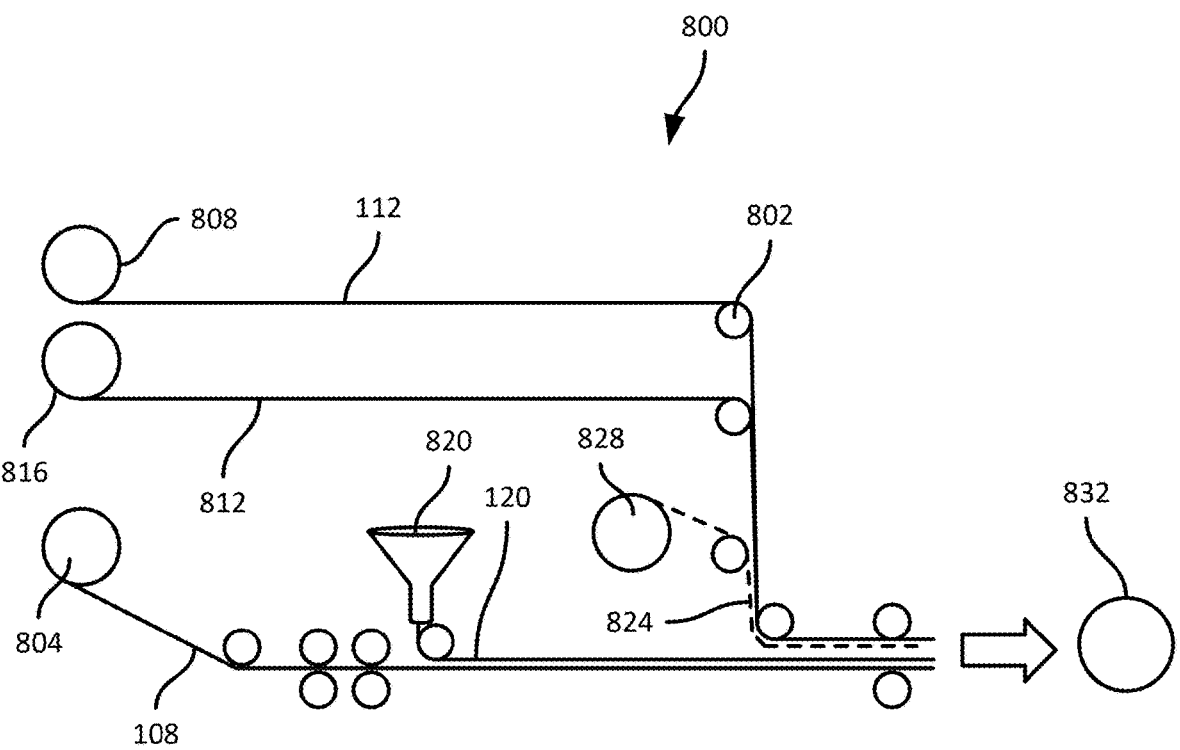
FIG. 8 illustrates a further example press configuration for manufacturing blanks.

In further examples, as illustrated in FIG. 8, a press 800 having a plurality of rollers 802 and/or other media-handling structures can be configured to accept the face stock 108 from a supply 804, and the film 112 from a supply 808. The press 800 can also be configured, in some examples, to accept a liner 812, such as a paper liner, from a further supply 816. The press can further be configured to apply the adhesive 120, e.g., in the form of a hot melt adhesive from a dispenser 820, to the face stock 108. The press 800 can be further configured to introduce a web 824 carrying the RF tags 140 from a supply 828. In this example, the web 824 is a wet inlay web, e.g., with an adhesive backing. The web 824 can be adhered to the film 112 and liner 812, and the combination of the film 112, liner 812, and web 824 can then be pressed onto the face stock 108 and adhesive 120 to produce blanks. The blanks can be assembled into a rolled supply 832, or other suitable form of blank supply. Various other methods of manufacture will also occur to those skilled in the art.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued. Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises." , "has." , "includes." , "contains." does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A wristband, comprising:
 a self-laminating body having:
  (i) a first film;
  (ii) an image-carrying member disposed on an outer surface of the first film; and
  (iii) a second film disposed over an outer surface of the image-carrying member, enclosing the image-carrying member between the first film and the second film;
 a band extending from one of the first film and the second film of the self-laminating body, the band configured to encircle a wrist; and
 a flexible integrated circuit chip enclosed between the first film and the second film of the self-laminating body.

2. The wristband of claim 1, wherein the flexible integrated circuit chip form part of a radiofrequency (RF) tag.

3. The wristband of claim 1, wherein the flexible integrated circuit chip is disposed between the first film and the image-carrying member.

4. The wristband of claim 1, wherein the flexible integrated circuit chip is disposed between the image-carrying member and the second film.

5. The wristband of claim 4, wherein the image-carrying member includes a non-printed area aligned with the flexible integrated circuit chip.

6. The wristband of claim 1, further comprising:

a second band extending from the other of the first film and the second film, the second band configured for coupling with the band to encircle the wrist.

7. The wristband of claim 1, wherein the flexible integrated circuit chip is part of an RFID tag that contributes to between 15 percent and 65 percent of a thickness of the wristband.

8. A wristband, comprising:

a self-laminating body having:

(i) a first film;

(ii) an image-carrying member disposed on an outer surface of the first film; and (iii) a second film disposed over an outer surface of the image-carrying member, enclosing the image-carrying member between the first film and the second film;

a first band extending from the self-laminating body;

a second band configured to couple with a distal end of the first band, the second band having a coupling portion configured to engage with the distal end of the first band; and a flexible integrated circuit chip disposed on one of the distal end of the first band, and the coupling portion of the second band.

9. The wristband of claim 8, further comprising:

a face stock member removably coupled to the distal end of the first band;

wherein the flexible integrated circuit chip is disposed between the face stock member and the first band.

10. The wristband of claim 8, wherein the flexible integrated circuit chip forms part of a radiofrequency (RF) tag.

11. The wristband of claim 8, wherein the first band is integrally formed with the self-laminating body.

12. The wristband of claim 11, wherein the second band is integrally formed with the self-laminating body.

13. The wristband of claim 11, further comprising:

a third band extending from the self-laminating body;

wherein the second band includes an extension configured to extend from the distal end of the first band to the third band.

14. The wristband of claim 13, wherein the integrated circuit chip is enclosed between the distal end of the first band, and the third band.

15. The wristband of claim 13, wherein the flexible integrated circuit chip is enclosed between the third band and the second band.

16. A printable blank, comprising:

a face stock layer including die cuts defining a removable image-carrying member having a first surface configured to receive printed indicia;

a film layer coupled to a second surface of the face stock layer, opposite the first surface, the film having die cuts defining a wristband including:

a self-laminating body aligned with the image-carrying member, the body having a first film, and a second film configured to laminate the image-carrying member to the first film; and a flexible integrated circuit chip disposed between the face stock layer and the film layer.

17. The printable blank of claim 16, wherein the flexible integrated circuit chip forms part of a radiofrequency (RF) tag.

18. The printable blank of claim 16, wherein the flexible integrated circuit chip is disposed between the image-carrying member and the first film.

19. The printable blank of claim 16, wherein the flexible integrated circuit chip is disposed between the face stock layer and the second film.

20. The printable blank of claim 16, wherein the wristband further includes:

a band extending from the self-laminating body; and wherein the integrated circuit is disposed between a distal end of the band and the face stock layer.

21. The printable blank of claim 16, wherein the flexible integrated circuit has a thickness of between about 0.1 mm and about 0.15 mm.

\* \* \* \* \*